United States Patent
Walter et al.

(10) Patent No.: US 10,119,419 B2
(45) Date of Patent: Nov. 6, 2018

(54) METHOD FOR DETERMINING BEARING PLAY OF EXHAUST-GAS-TURBOCHARGER FRICTION BEARINGS

(75) Inventors: Norbert Walter, Ludwigshafen (DE); Andre Seiler, Dittelsheim-Hessloch (DE)

(73) Assignee: BorgWarner Inc., Auburn Hills, MI (US)

(*) Notice: Subject to any disclaimer, the term of this patent is extended or adjusted under 35 U.S.C. 154(b) by 1451 days.

(21) Appl. No.: 13/499,946

(22) PCT Filed: Oct. 1, 2010

(86) PCT No.: PCT/US2010/051032
§ 371 (c)(1),
(2), (4) Date: Apr. 3, 2012

(87) PCT Pub. No.: WO2011/046758
PCT Pub. Date: Apr. 21, 2011

(65) Prior Publication Data
US 2012/0197579 A1    Aug. 2, 2012

(30) Foreign Application Priority Data
Oct. 16, 2009   (DE) .................... 10 2009 049 692

(51) Int. Cl.
*F01D 25/16*   (2006.01)
*F02C 6/12*    (2006.01)
(Continued)

(52) U.S. Cl.
CPC .............. *F01D 25/166* (2013.01); *F02C 6/12* (2013.01); *F16C 17/246* (2013.01);
(Continued)

(58) Field of Classification Search
USPC .............................. 415/177, 407; 246/169 A
See application file for complete search history.

(56) References Cited

U.S. PATENT DOCUMENTS

| | | | |
|---|---|---|---|
| 6,712,518 B2 | 3/2004 | Takamizawa et al. | |
| 7,184,930 B2 * | 2/2007 | Miyasaka | B61F 15/20 246/169 A |
| 2010/0226602 A1 | 9/2010 | Laredius | |

FOREIGN PATENT DOCUMENTS

| | | |
|---|---|---|
| DE | 10219430 A1 | 11/2003 |
| JP | 61-206814 A | 9/1986 |

(Continued)

OTHER PUBLICATIONS

Indian Office Action (with English language translation) dated Apr. 3, 2018, in Indian Application No. 847/KOLNP/2012.

*Primary Examiner* — Lam Nguyen
(74) *Attorney, Agent, or Firm* — Eric L. Doyle; Stephan A. Pendorf; Patent Central LLC (57) ABSTRACT

The invention relates to a method for determining bearing play of exhaust-gas-turbocharger friction bearings comprising the following method steps: accelerating the exhaust-gas turbocharger or the body group from standstill to a maximum rotational speed and at the same time registering the vibration acceleration by means of a sensor; determining the constant-tone frequency of the friction bearing at at least one rotational speed; plotting the determined constant-tone frequency in a diagram, in which bearing-play ranges determined experimentally in advance are assigned to constant-tone frequency ranges; and establishing whether or not the determined constant-tone frequency lies in a bearing-play target range.

4 Claims, 6 Drawing Sheets

(51) Int. Cl.
   *G01M 13/04*      (2006.01)
   *F16C 17/24*      (2006.01)
(52) U.S. Cl.
   CPC ....... *G01M 13/045* (2013.01); *F05D 2220/40* (2013.01); *F05D 2260/80* (2013.01); *F16C 2360/24* (2013.01)

(56) References Cited

FOREIGN PATENT DOCUMENTS

| | | |
|---|---|---|
| JP | 06-344233 A | 12/1994 |
| JP | 11-153425 A | 6/1999 |
| JP | 2002-364660 A | 12/2002 |
| JP | 2008070305 A | 3/2008 |
| WO | 2008-041919 A1 | 4/2008 |

\* cited by examiner

METHOD FOR DETERMINING BEARING PLAY OF EXHAUST-GAS-TURBOCHARGER FRICTION BEARINGS

BACKGROUND OF THE INVENTION

Field of the Invention

The invention relates to a method for determining bearing play of radial friction bearings of an exhaust-gas turbocharger.

Description of the Related Art

Radial friction bearings are a type of bearing that is commonly utilized in exhaust-gas turbochargers. A distinction is primarily made between floating (rotating) and fixed (non-rotating) bearing bushings. During operation, they constitute a vibratory system whose properties are influenced by both the geometry of the individual parts and the properties of the lubricating oil. As a result of the rotation, vortices can be generated in the lubricating oil film, which vortices are also known by the terms half-frequency vortex, oil whirl or oil whip and are able to bring about self-excited vibrations. The natural frequency of the system of such a friction bearing can become acoustically conspicuous when excited by the rotating shaft if, on the one hand, certain vibration acceleration levels are exceeded and, on the other hand, the exhaust-gas turbocharger is arranged in low-noise motor surroundings. In order to suppress annoying noise connected thereto, such as the so-called constant tone, the frequency of which mainly lies in the range between 200 and 1500 Hz, measures can be taken to influence the natural frequency of the system. The bearing play constitutes a particularly influential measure. This can be the outer and/or inner bearing play.

In order to be able to ascertain the bearing play between the friction-bearing bushings and the shaft or the bearing housing, both the bearing bushings and the shafts and bearing-housing bores currently have to be measured in order to be able to combine suitable workpiece pairings that meet the respective requirements for the bearing play.

However, this procedure is very complex and thereby increases the production costs.

It is therefore an object of the present invention to develop a method for determining bearing play of exhaust-gas-turbocharger friction bearings that can be used to determine the bearing play of friction bearings in exhaust-gas turbochargers in a simple and technically reliable fashion.

BRIEF SUMMARY OF THE INVENTION

Herein, examinations conducted within the scope of the invention have shown that in friction bearings there is a relation between the bearing play and the constant tone generation (level and frequency). Further influencing parameters include the value of the remaining imbalance and the oil stiffness, which depends on the oil pressure, the oil temperature and the oil viscosity. According to the invention, the relation between the bearing play and the constant-tone frequency is utilized for determining the bearing play. According to this, the invention allows bearing play to be obtained with very tight tolerances without geometric measurement and assignment of the individual parts within defined boundaries.

The particular advantages of the method according to the invention include the fact that the bearing of the exhaust-gas turbocharger does not have to be disassembled in order to determine the bearing play. According to the invention, it is advantageously possible in the process to determine or to examine both the inner bearing play (between bearing-bushing bore and shaft) and the outer bearing play (between bearing-bushing outer diameter and bearing housing) in order to make a selection.

Thus, the invention can ensure that the manufactured and balanced exhaust-gas turbochargers are produced with a bearing play within certain boundaries and the agreed boundary values for the bearing play can be observed.

The method according to the invention can likewise be used for wear-and-tear measurements, wherein the change of bearing play can be monitored and determined without disassembling the exhaust-gas turbocharger.

The dependent claims contain advantageous developments of the invention.

The constant-tone frequency is preferably determined during the production of the exhaust-gas turbocharger or the body group thereof (all components of the exhaust-gas turbocharger, but without compressor housing and turbine housing and without control components) on an operational balancing bench after balancing.

For this, a sensor for example can be used to determine the vibration acceleration occurring when the rotational speed of the turbocharger rotating body group, including a shaft having a turbine wheel mounted to one end and a compressor wheel mounted to the other end, is ramped up. Subsequently, there is a frequency analysis (FOURIER transform) using a defined frequency resolution at one or two rotational speeds, selected in advance, at which the constant tone caused by the inner and/or outer bearing play can be measured well. In the resultant frequency spectrum, a curve maximum with a large amplitude is sought after within one previously fixed frequency range or two previously fixed frequency ranges. The maximum found in each frequency range constitutes a sought-after constant-tone frequency and can be assigned to the inner or outer bearing play due to the frequency thereof.

Examinations have shown that depending on turbo-charger type, there are particularly suitable rotational speeds that lead to a well measurable constant tone and allow unambiguous determination of the constant-tone frequency. By way of example, an exhaust-gas turbocharger with approximately 40 mm wheel diameter has such a stable range at 150 000 rpm. However, the principle also allows other rotational speeds, such as 120000 rpm or even 180000 rpm.

Furthermore, the use of a sensor for recording an acceleration-vibration signal constitutes a preferred embodiment, wherein the sensor should advantageously be attached to the compressor-housing side. Although attachment to the turbine-housing or bearing-housing side is feasible in principle, it is not preferred because of the weaker signal available at said location.

Depending on the embodiment of the test bench, complete exhaust-gas turbochargers with their housings already assembled or merely body groups can be subjected to the ramp up, wherein special test bench housings, so-called master housings, are required in the latter case.

BRIEF DESCRIPTION OF THE SEVERAL VIEWS OF THE DRAWINGS

Further details, advantages and features of the invention emerge from the following description of the Figures of the attached drawing, in which.

DETAILED DESCRIPTION OF THE INVENTION

Figure 6:
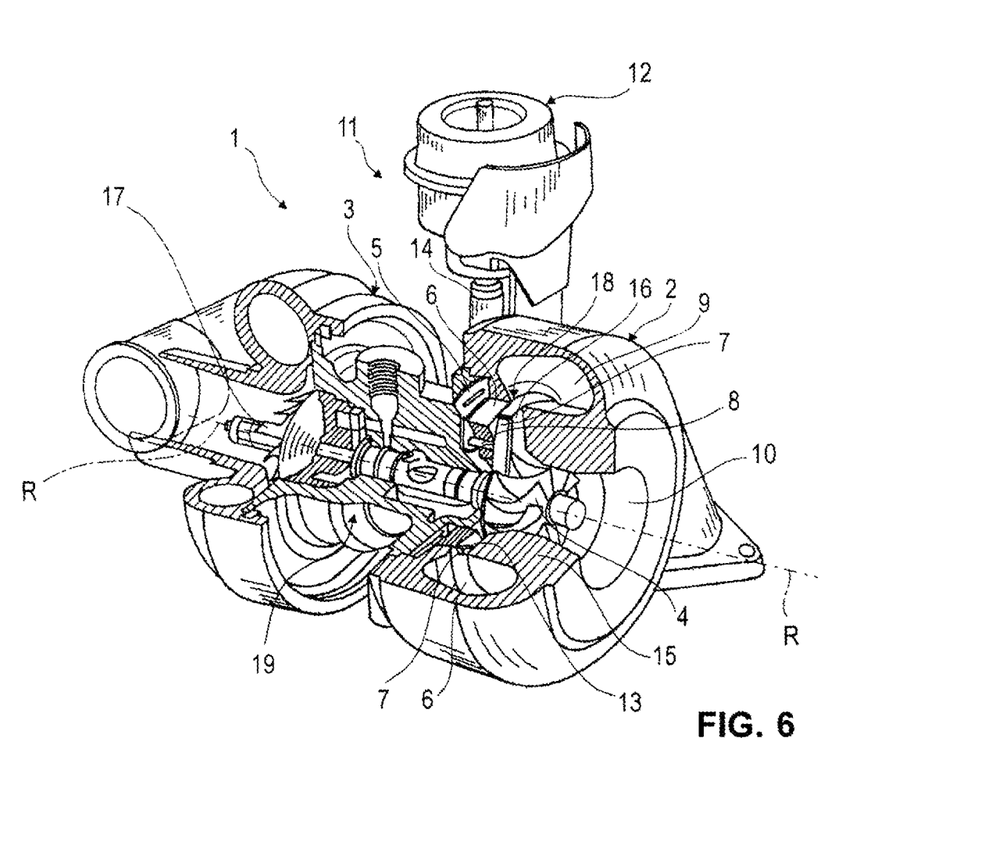
FIG. 6 shows a perspective, partly cut-open view of an exhaust-gas turbocharger.

The exhaust-gas turbocharger 1 illustrated in FIG. 6 has the features that can be gathered from the list of reference signs found at the end of this description, wherein the term "rotating body group" in the case of the turbocharger 1 illustrated in FIG. 6 is understood to mean all components bar the turbine housing 2, the compressor housing 3, the bearing housing 19, the VTG mechanism, and the control components 11, 12 and 14 (i.e., to exclude the non-rotating components).

If the bearing play of such a turbocharger 1 should be determined as per the method according to the invention, the body group visible in FIG. 6 is firstly assembled. The body group is thereafter balanced on a balancing bench not illustrated in any more detail in the drawings. Depending on the design of the balancing bench, the body groups may already contain the housing and control components required for completion as the turbocharger.

After balancing, the body group or the turbocharger is accelerated to a maximum rotational speed from standstill during a rotational-speed ramp up. The vibration acceleration level of the friction bearing is determined during this rotational-speed ramp up. For this, the vibration accelerations can for example be plotted against the time of the turbocharger 1 required during the ramp up by means of a sensor (referred to as "BA sensor" in FIG. 1).

Figure 1:
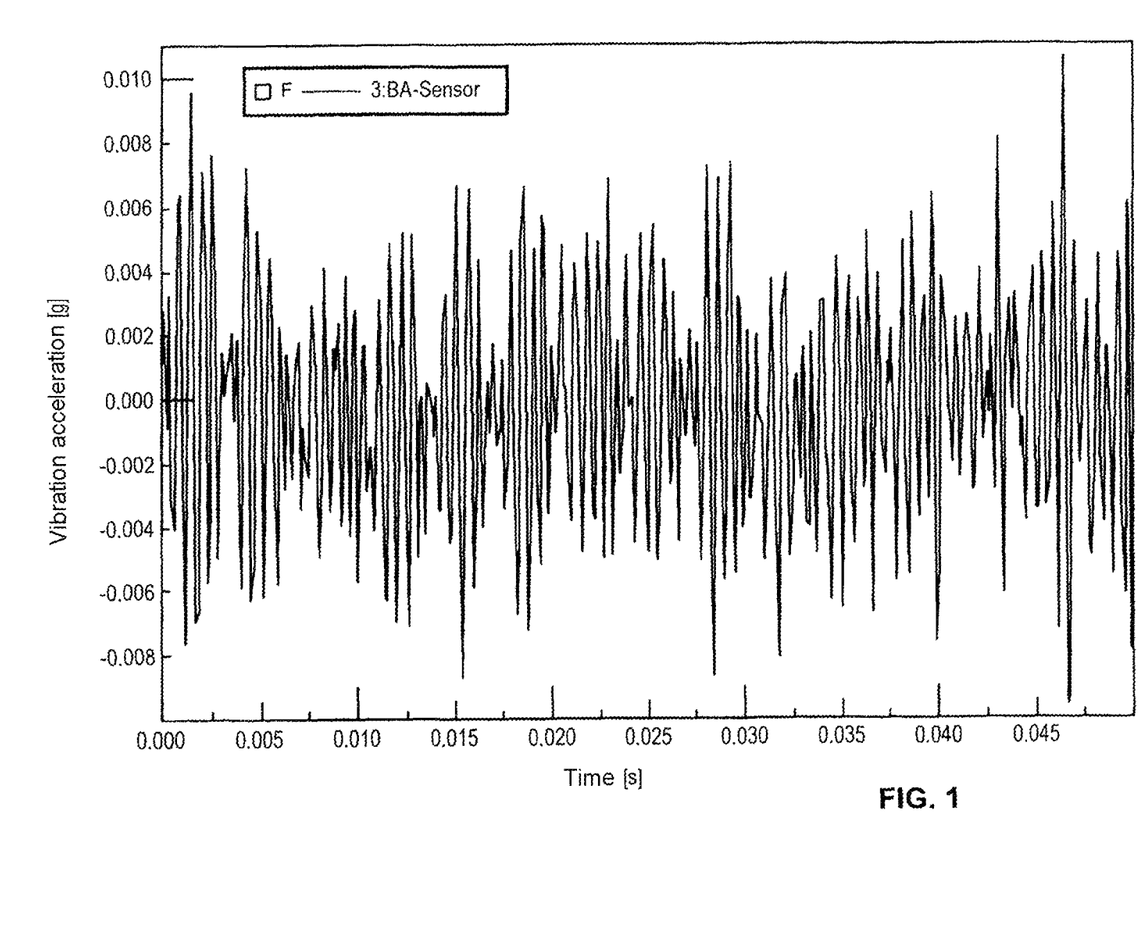
FIG. 1 shows a diagram showing the vibration accelerations as a function of the time during a rotational-speed ramp up.

Depending on the friction-bearing type, the stored time signal of the BA sensor is subsequently analyzed at one or two rotational speeds by means of a FOURIER transform. The rotational speed to be used or the rotational speeds to be used were determined in advance on the basis of an equivalent turbocharger type under similar test-bench conditions (attachment of the turbocharger, position of the sensor, type of oil supply).

Figure 2:
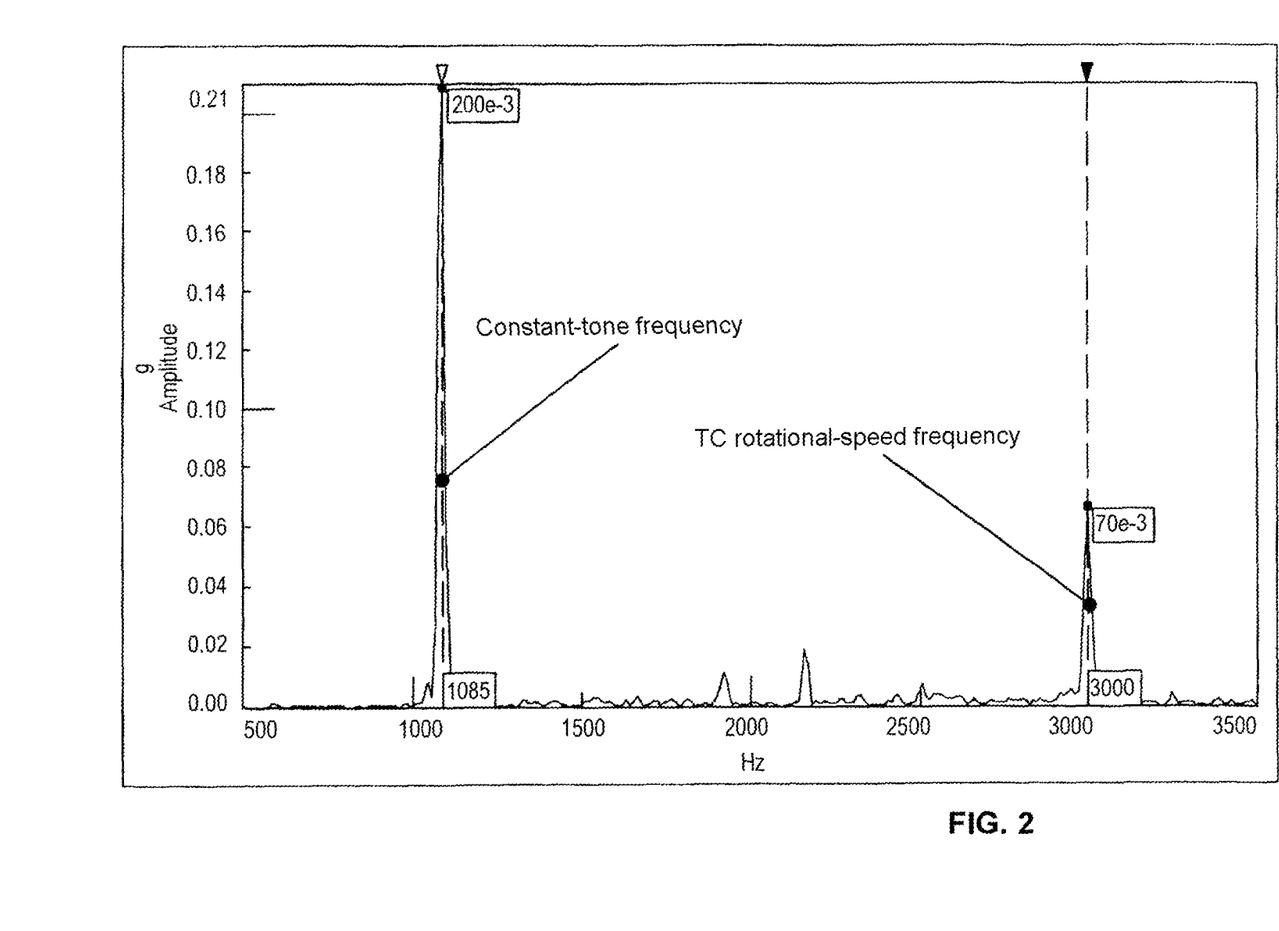
FIG. 2 shows a diagram showing a frequency analysis for a constant rotational speed at 180 000 rpm.

FIG. 2 shows a frequency analysis for a turbocharger rotational speed of 180000 rpm, corresponding to a frequency of 3000 Hz, determined by means of a FOURIER transform. Apart from the maximum at 3000 Hz, which reflects the rotational frequency of the turbocharger, a further maximum can be recognized at 1085 Hz, which characterizes the constant tone. It is advantageous to perform the frequency analysis at a suitable resolution as a function of the time required for the rotational-speed ramp up.

Figure 4:
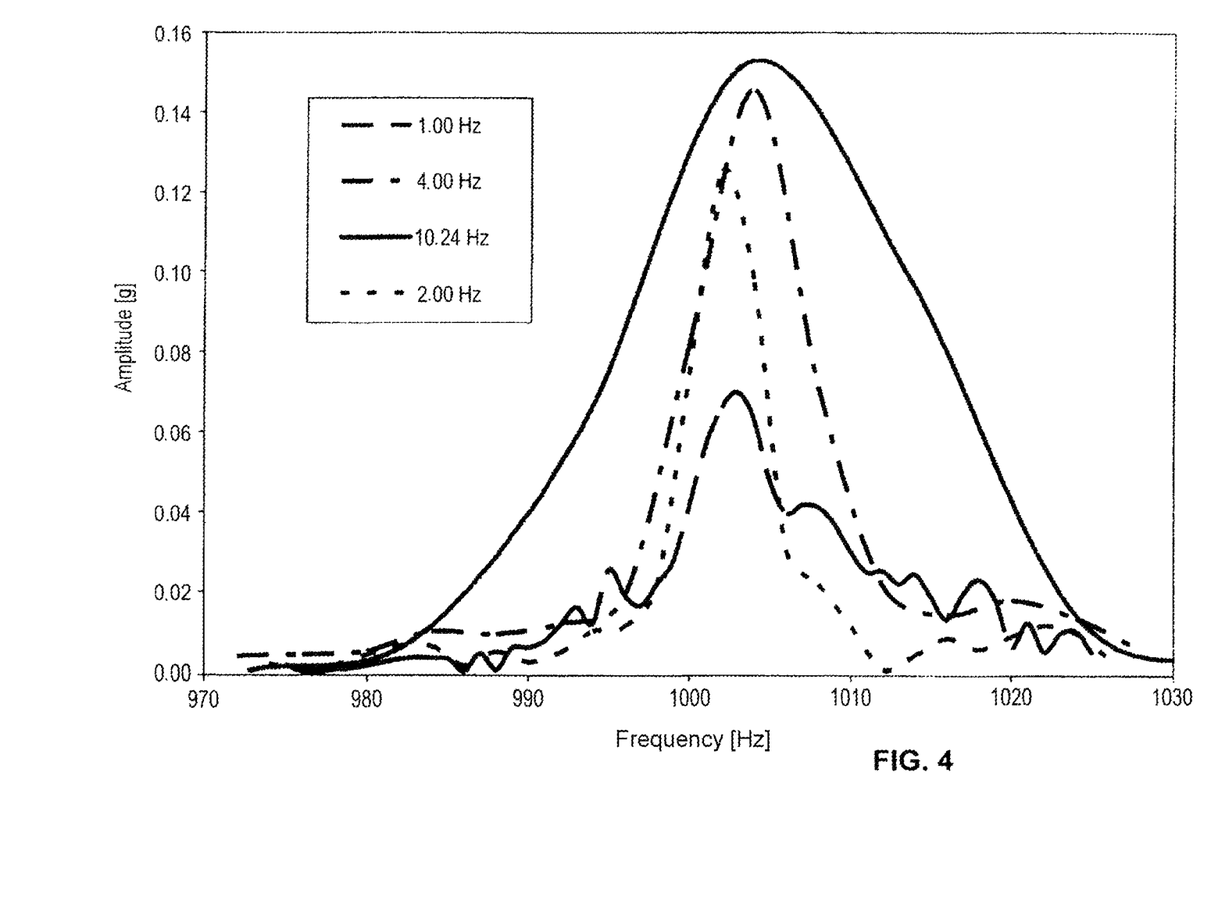
FIG. 4 shows constant-tone maxima (e.g. at a turbocharger rotational speed of 150000 rpm) determined using different frequency resolutions.

This frequency resolution is illustrated in FIG. 4. Examinations conducted within the scope of the invention have shown that a frequency resolution between 2 Hz and 4 Hz leads to particularly preferred results for this because, as is gathered from FIG. 4, depending on the utilized resolution the shape of the constant-tone curve varies strongly in its height (amplitude) and width (frequency). Constant-tone frequencies that are as precise as possible are obtained by curves with small width, which is the case in the resolutions of 2 Hz and 4 Hz.

It is conventional for only one frequency resolution (e.g. 2 Hz) from this range to be utilized for the frequency analysis in the method according to the invention. FIG. 4 also plots resolution values differing therefrom (1 Hz; 10.24 Hz) in order to clarify that this leads to wider curves, i.e. less precise frequency determinations.

Figure 5:
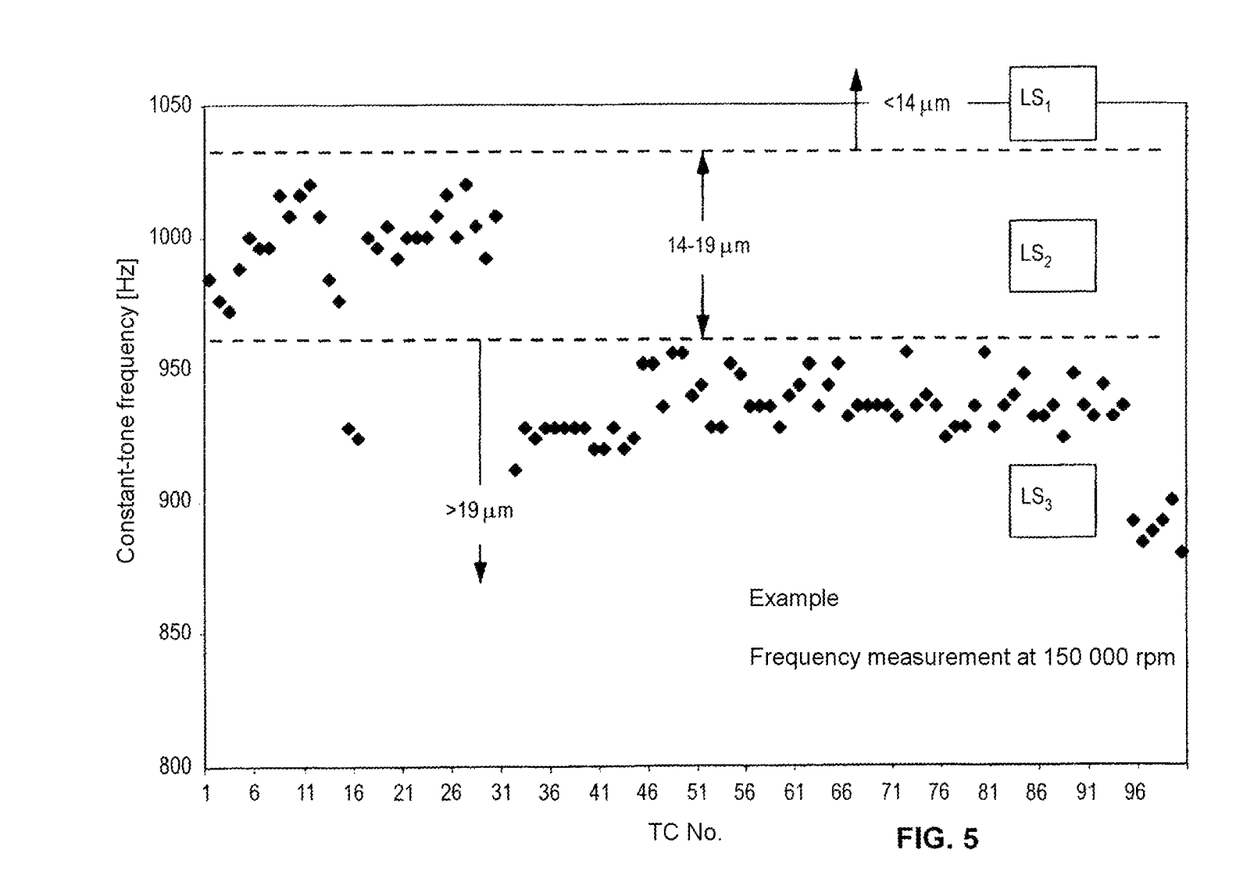
FIG. 5 shows a diagram of the measurement results of 100 turbochargers, in which the constant-tone frequencies assigned to the turbochargers are plotted and, furthermore, in which three bearing-play ranges are specified in an exemplary fashion.

Once these constant-tone frequencies have been determined during an examination of a certain number of turbochargers, the results can be transferred to the diagram as per FIG. 5. In the example of FIG. 5, 100 exhaust-gas turbochargers were examined, the numbers of which are plotted along the x-axis.

The frequency is plotted along the y-axis, and the diagram plots the determined constant-tone frequencies assigned to the respective turbochargers. The respective points illustrate these determined constant-tone frequencies.

Figure 3:
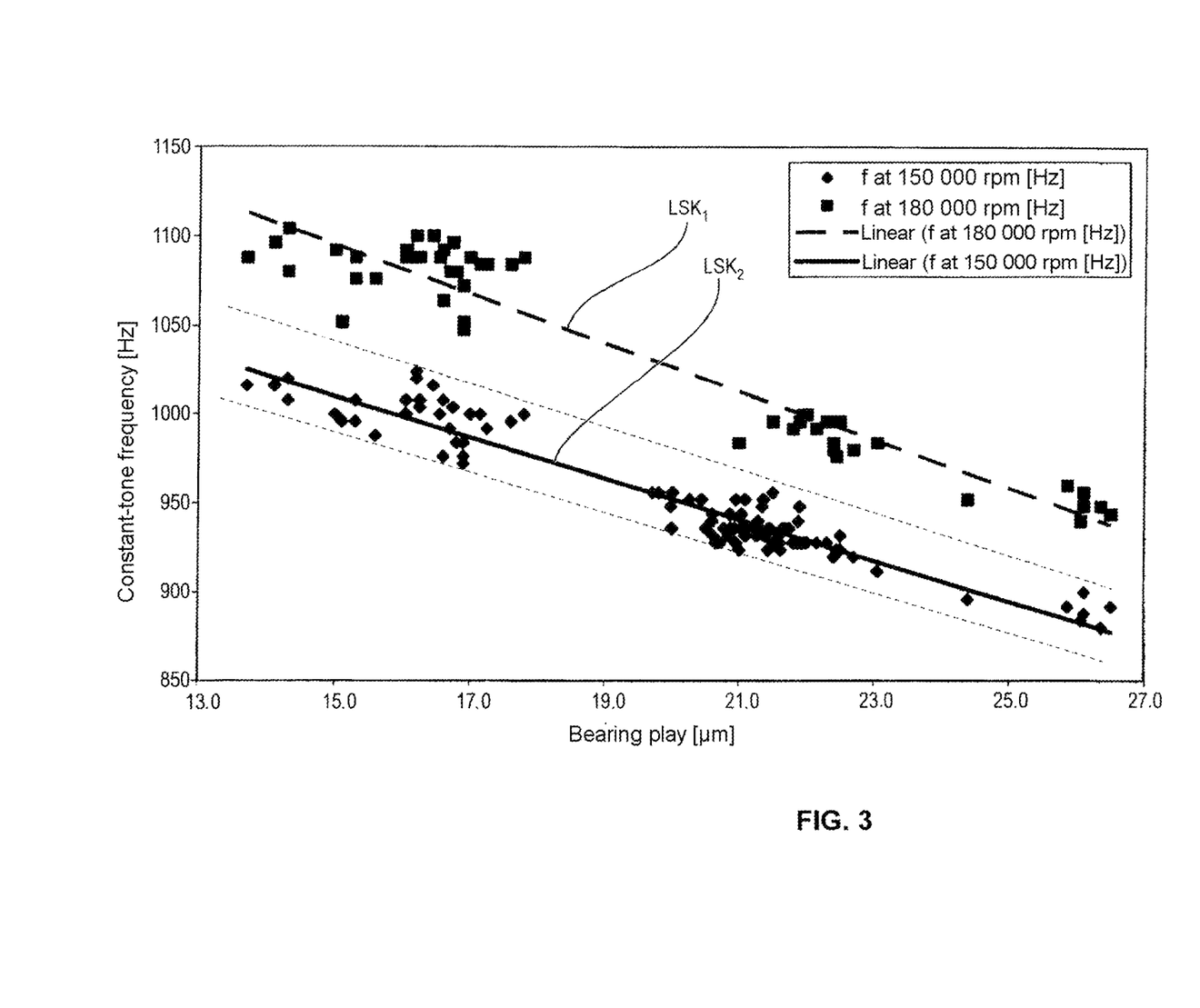
FIG. 3 shows a diagram for explaining the relation between constant-tone frequency and inner bearing play.

Furthermore, the diagram in FIG. 5 clarifies three bearing-play ranges $LS_1$, $LS_2$ and $LS_3$. These bearing-play ranges in relation to the respective constant-tone frequencies are the results of examinations carried out by experiment, as clarified in FIG. 3 on the basis of the two graphs $LSK_1$ and $LSK_2$.

Thus, the evaluation as per FIG. 5 makes it possible to ascertain which of the total of 100 measured exhaust-gas turbochargers can be assigned to which bearing-play range. It is practical for the procedure according to the invention, which was previously explained on the basis of FIGS. 1 to 5, to be carried out preferably electronically using suitable software.

In addition to the written disclosure of the invention, reference is herewith explicitly made to the drawn illustration of said invention in FIGS. 1 to 6.

LIST OF REFERENCE SIGNS

1 Turbocharger
2 Turbine housing
3 Compressor housing
4 Turbine rotor
5 Adjustment ring
6 Blade bearing ring
7 Guide blades
8 Blade shaft
9 Supply channel
10 Axial adaptors
11 Actuating arrangement
12 Control housing
13 Clear space for guide blades 7
14 Ram element
15 Annular part of the turbine housing 2
16 Spacer/spacing lobe
17 Compressor rotor
18 Guide blade cascade diffuser
19 Bearing housing
$LSK_1$ Bearing play curve for a rotational speed of 180000 rpm
$LSK_2$ Bearing play curve for a rotational speed of 150000 rpm
$LS_1$, $LS_2$, $LS_3$ Bearing-play ranges

The invention claimed is:

1. A method for evaluating exhaust-gas-turbocharger friction bearings, comprising the following method steps:

accelerating a rotating body group of a turbocharger, the rotating body group comprising turbine wheel, compressor wheel, and shaft, said shaft supported by friction bearings, from standstill to a maximum rotational speed on a test bench and at the same time registering the vibration acceleration by means of a sensor;

using the registered vibration acceleration to determine a constant-tone frequency associated with the friction bearings at at least one rotational speed of the turbocharger;

looking up the determined constant-tone frequency on a diagram prepared by experimentally measuring constant-tone frequency and bearing-play of a number of friction bearings and showing a correlation between constant-tone frequency and bearing-play; and if the determined constant-tone frequency corresponds to a bearing play associated with an acoustically conspicuous noise when in vehicle, rejecting the exhaust-gas-turbocharger friction bearings.

2. The method as claimed in claim 1, wherein a frequency spectrum is determined for determining the constant-tone frequency at a rotational speed of the exhaust-gas turbocharger determined experimentally in advance.

3. The method as claimed in claim 2, wherein the constant-tone frequency is determined during the production of the exhaust-gas turbocharger on an operational balancing bench.

4. The method as claimed in claim 3, wherein the oil temperature, the oil pressure, and/or the oil viscosity are taken into account as bearing-oil parameters.

* * * * *